United States Patent [19]
Pritty et al.

[11] Patent Number: 4,819,229
[45] Date of Patent: Apr. 4, 1989

[54] LOCAL AREA NETWORK PRIORITY CONTROL SYSTEM

[75] Inventors: David W. Pritty, Helensburgh; Derek Masson, Bearsden, both of Scotland

[73] Assignee: University of Strathclyde, Glasgow, Scotland

[21] Appl. No.: 24,412

[22] Filed: Mar. 10, 1987

[30] Foreign Application Priority Data

Mar. 13, 1986 [GB] United Kingdom ............... 8606217

[51] Int. Cl.⁴ ............................................. H04J 3/02
[52] U.S. Cl. ..................................... 370/89; 340/825.5
[58] Field of Search ................ 370/89, 85, 86, 60, 370/94; 340/825.5, 825.51

[56] References Cited

U.S. PATENT DOCUMENTS

| | | | |
|---|---|---|---|
| 4,642,630 | 2/1987 | Beckner et al. | 340/825.5 |
| 4,707,829 | 11/1987 | Pendse | 370/86 |
| 4,709,364 | 11/1987 | Hasegawa et al. | 370/86 |

OTHER PUBLICATIONS

ANSI/IEEE Standard 802.5-1985 ISO Draft Proposal.
IEEE Standard 802.5-1985.
FDDI Token Ring Media Access Control (MAC), Draft Proposed American National Standard 2-28-86.
"The Law-Dth 140 MBIT/S Token Ring by Sharp, Feb. 1987 at IFIPWG 6.Y Workshop on Lan", West Germany.

*Primary Examiner*—Douglas W. Olms
*Attorney, Agent, or Firm*—Stephen G. Rudisill

[57] ABSTRACT

A LAN priority control system is described which uses an interrupt priority control structure which suspends transmission of a packet from a lower priority node and allows a higher priority interrupting node, which desires to transmit a higher priority message, to obtain rapid access to the transmission medium and to transmit the message. The message is interrupted using a within packet interrupt which is taken to include any command which results in the transmission of a packet onto a common-medium being halted before the complete packet has been transmitted. In addition, the priority of nodes can be adjusted by a centralized network manager or by intelligent terminals distributed amongst the nodes, allowing priorities to be adjusted at nodes to correspond to the relative priorities of messages currently at these nodes rather than having a fixed allocation of priorities. In a token ring implementation, suspension of the message causes a busy token to be released which recirculates round the ring. A token is then freed to the interrupting node or nodes which claims the token and uses the token to transmit the higher priority message and, after transmission cycle of the message, the token is returned to its free state and its original node to complete transmission of the original message, in the absence of another active higher priority node.

The within packet interrupt can be implemented in software or hardware and is suitable for use with token passing local area networks and especially a token passing ring.

27 Claims, 12 Drawing Sheets

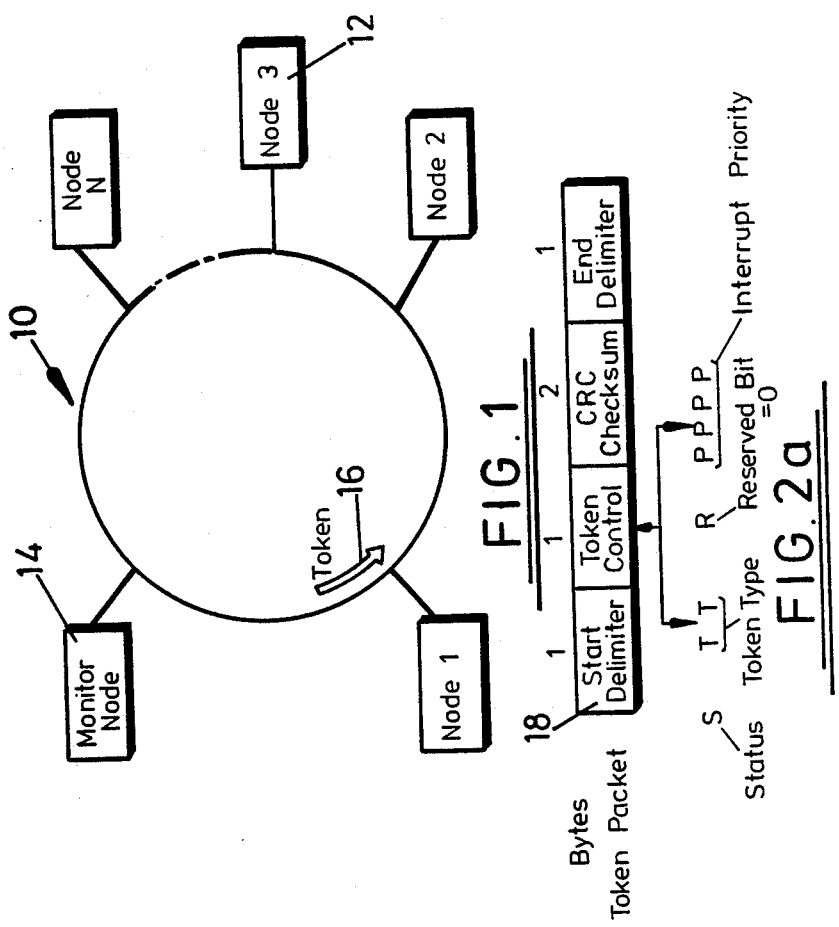

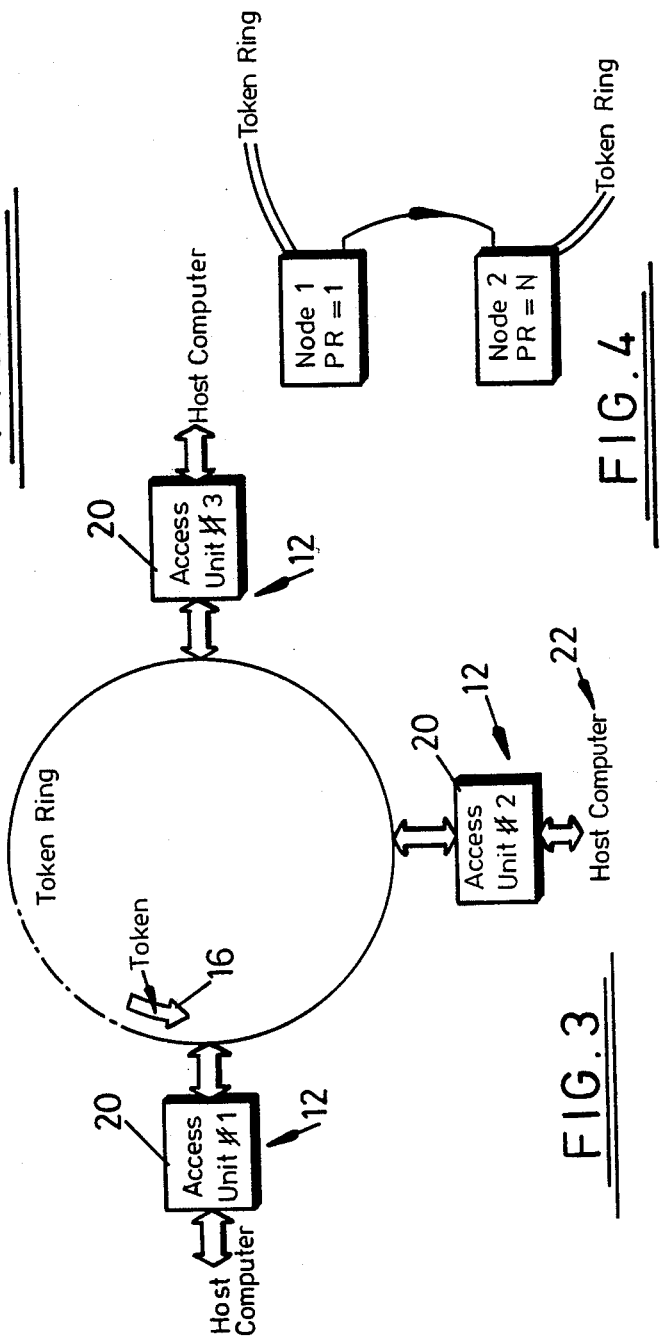

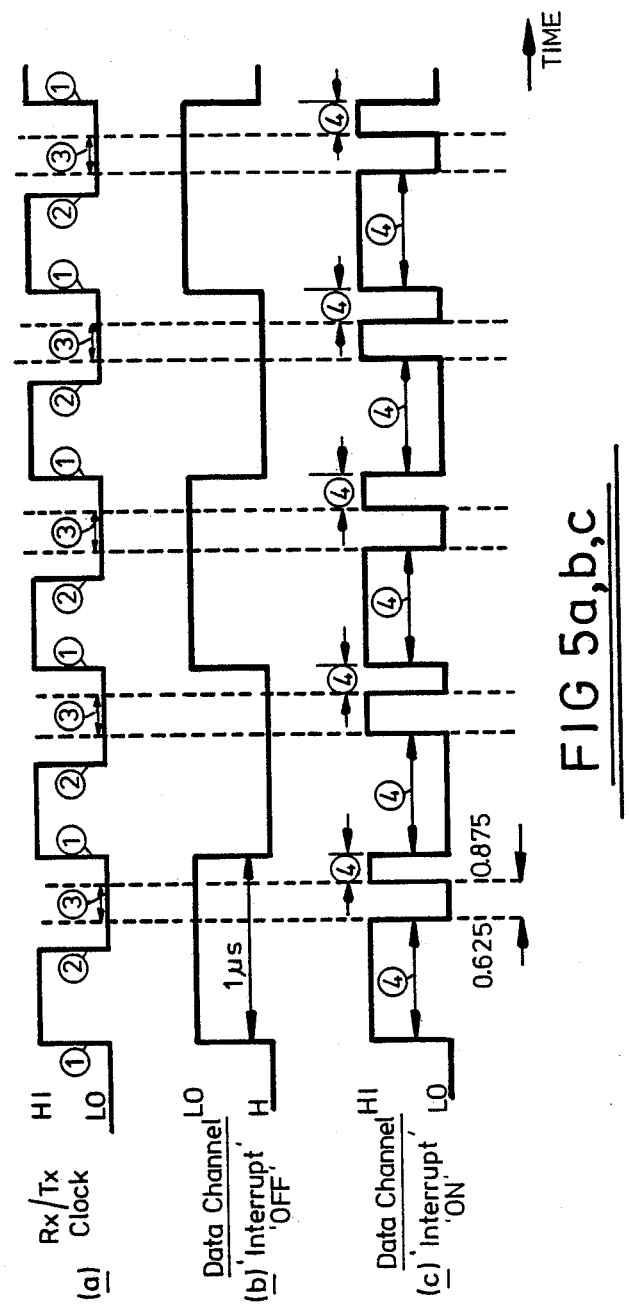
FIG 5a,b,c

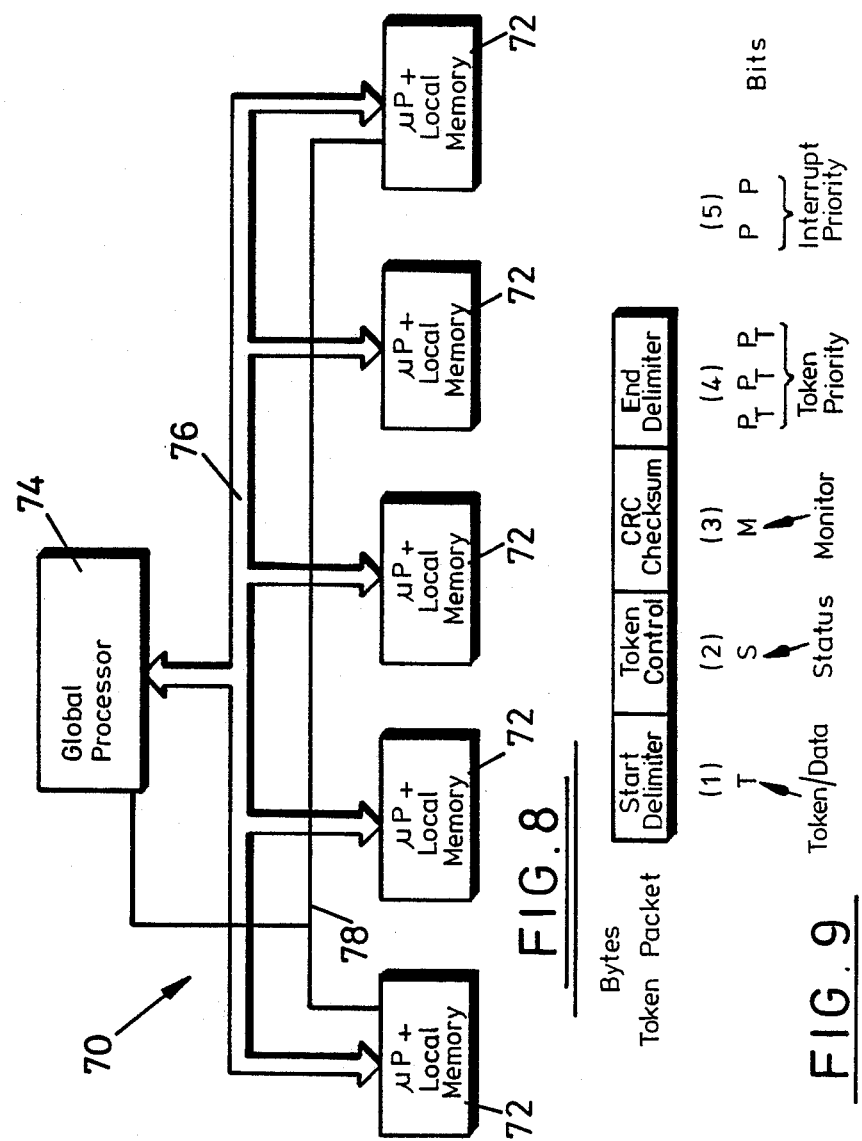

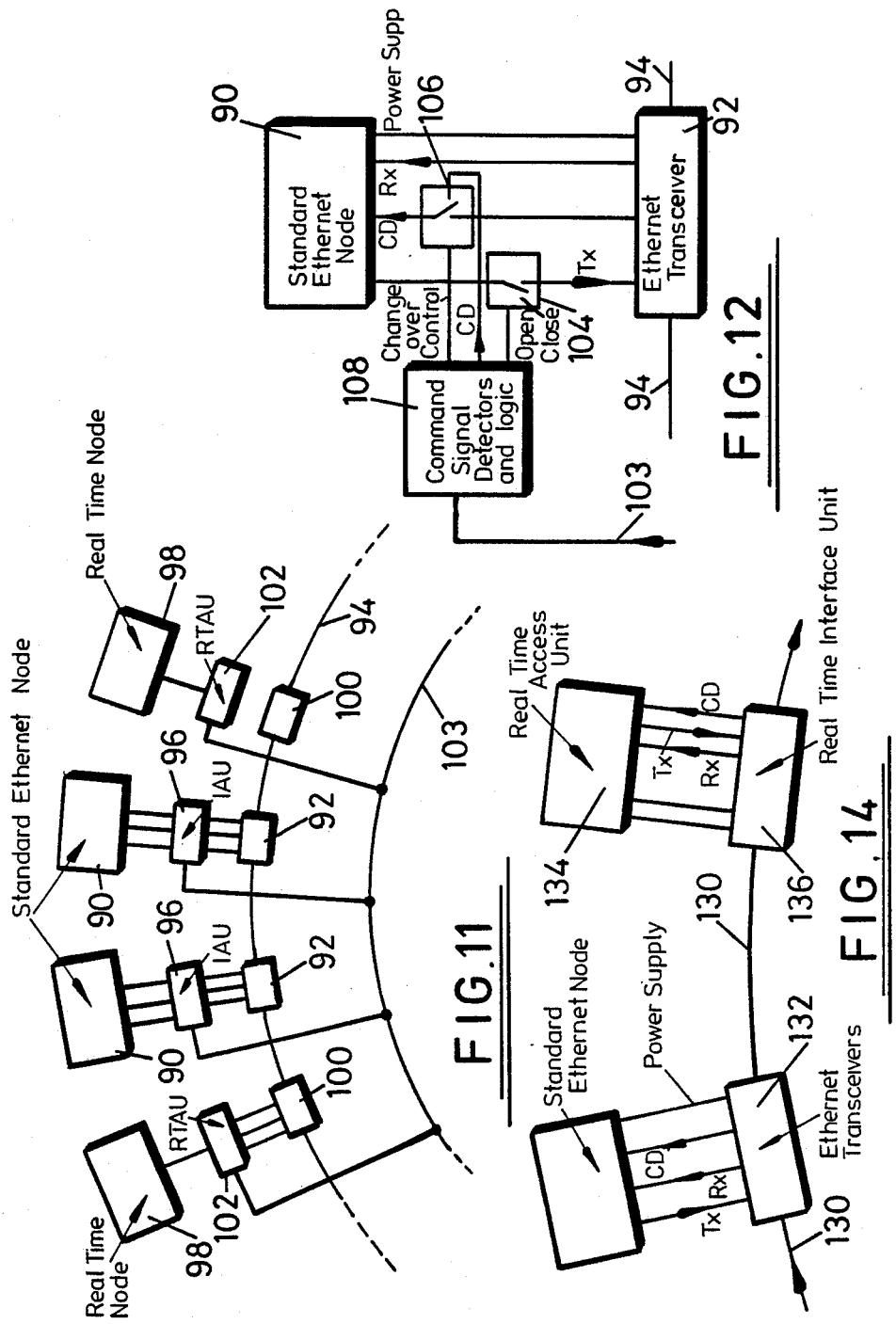

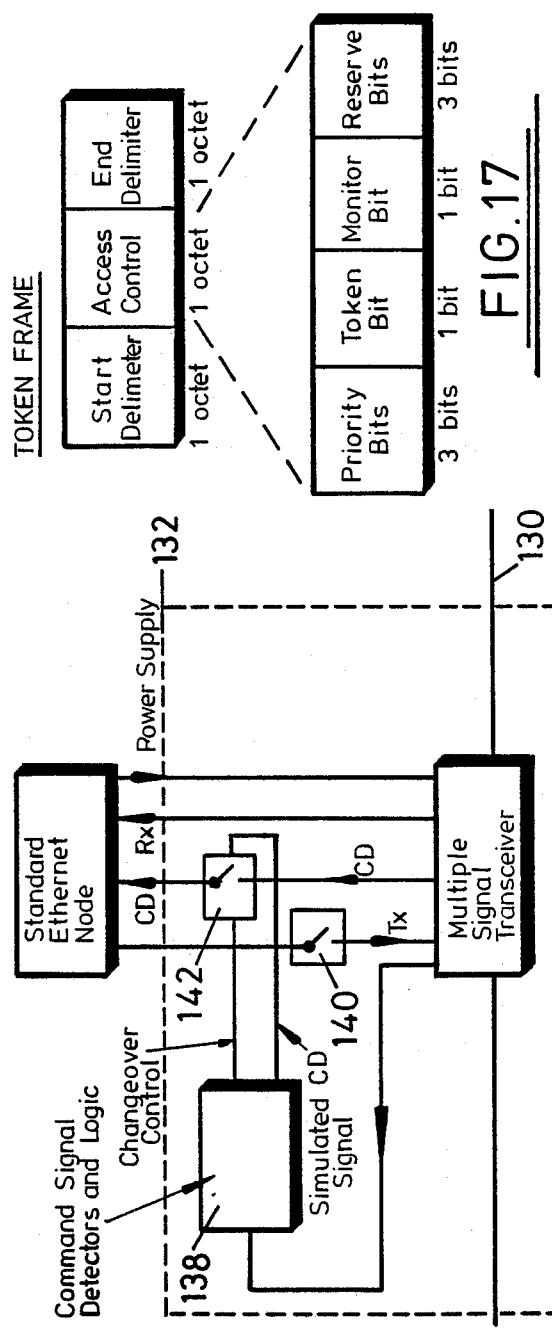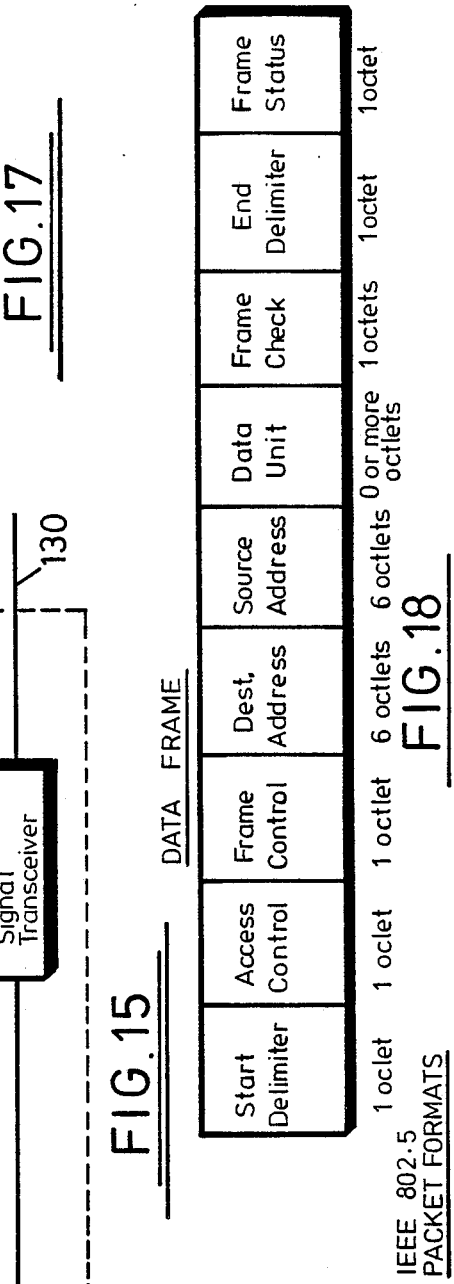
FIG. 17
FIG. 15
FIG. 18
TOKEN FRAME
DATA FRAME
IEEE 802.5 PACKET FORMATS

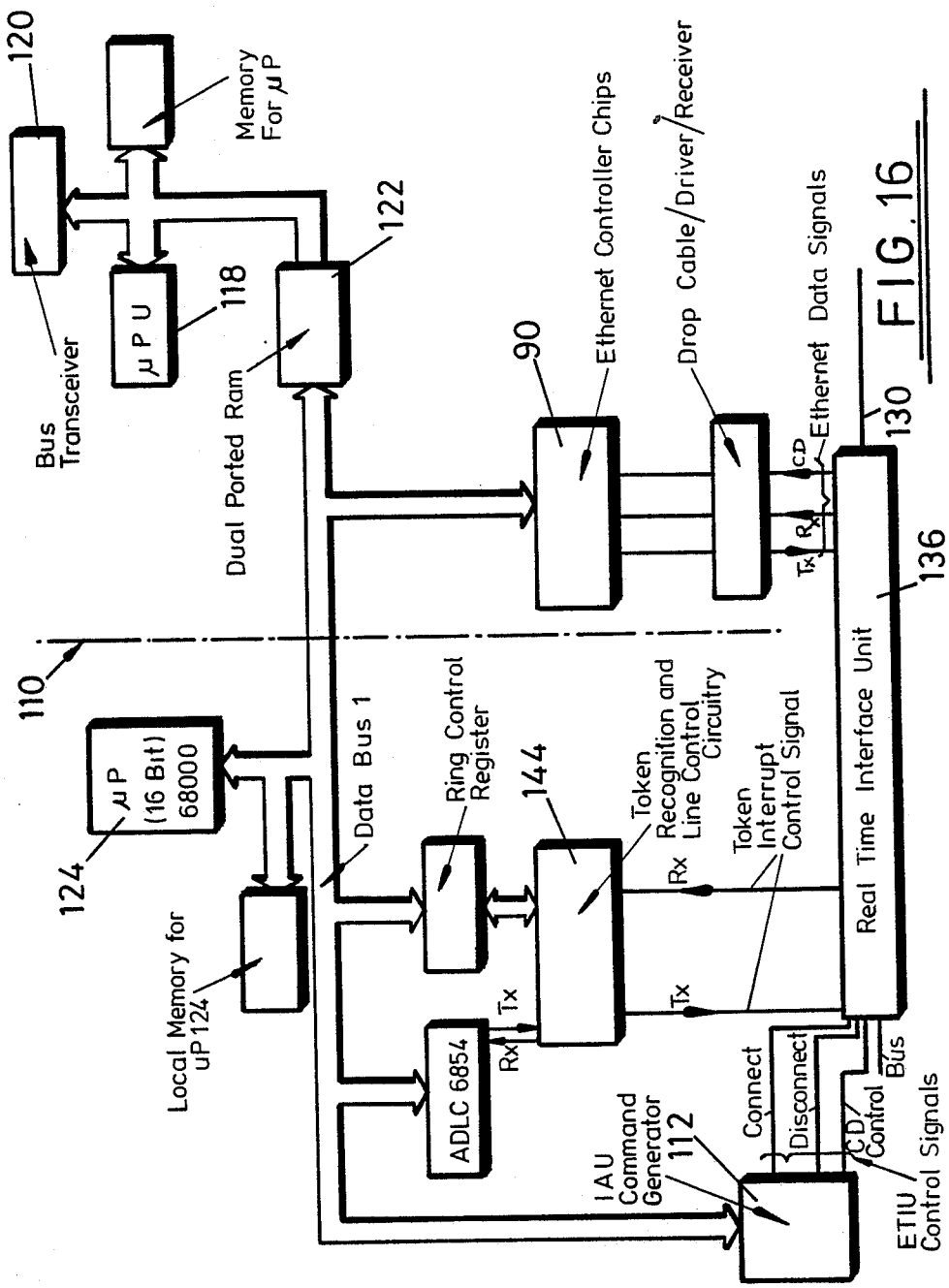

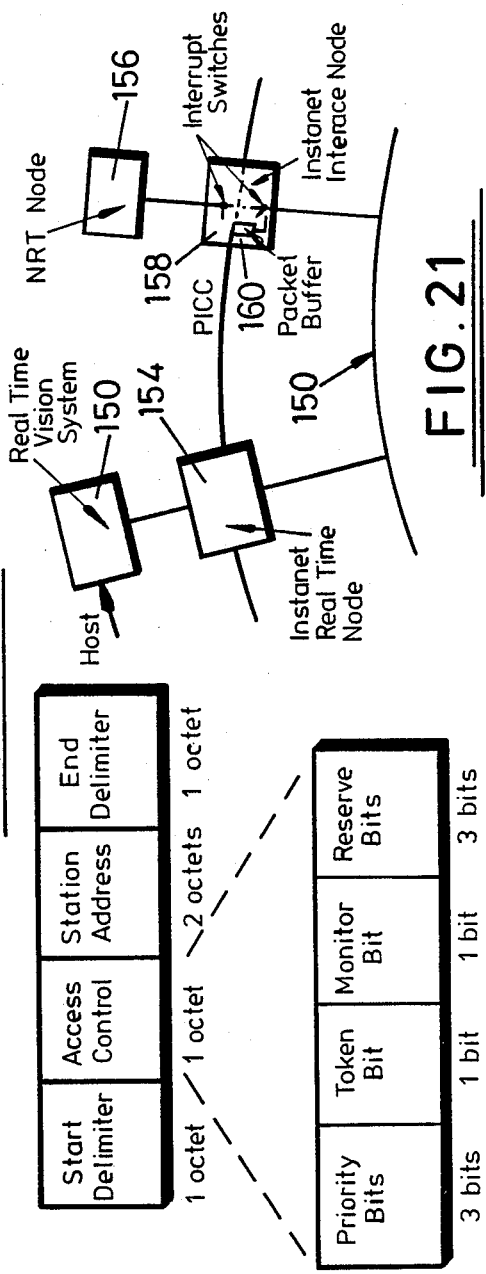

LOCAL AREA NETWORK PRIORITY CONTROL SYSTEM

TECHNICAL FIELD

The present invention relates to a local area network priority control system, particularly, but not exclusively, for controlling access of a node to a shared transmission medium where control of the transmission medium is distributed. In particular, it relates to providing almost immediate access to the shared transmission medium for time critical messages and for dynamic allocation of priority facilities on a common shared medium. More particularly, it relates to permitting higher priority messages to obtain access to the shared transmission medium even when a lower priority message is being transmitted in the medium. The present invention particularly relates to a priority system for use with a token-passing ring in which data is transmitted serially. Alternatively the invention may be used with a collision detection system such as the Ethernet system.

BACKGROUND OF THE INVENTION

In local area network priority systems, and in particular in token passing systems, such as a token ring, priority of access is determined by the position of the token. Generally, the token circulates through each node on the ring and, if a node desires to transmit obtains a free token, it can then transmit its message over the shared transmission medium. Such systems are known as matched priority systems. In a desirable local area network priority system, whilst normally permitting matched priority in one mode of operation, it should also permit simultaneous operation of a multiple priority mode which allows rapid access of higher priority messages which are independent of maximum data packet sizes. Such a multiple priority system should be implemented using hardware and software and should have applicability in local area networks where data is serially passed i.e. in token-passing buses and in particular token-passing rings and also parallel processing systems where information is transmitted in parallel. A multiple priority system could also permit dynamic reconfiguration of node priorities as and when required. This would permit flexibility of operation in allowing change in the node priority as and when required to allow priorities to be allocated to individual messages and such a scheme can involve the use of a network manager.

In existing local area network priority systems, and in particular in token passing systems such as token rings, or token buses having multiple nodes coupled to the medium, the access time (for a given medium data rate) of each node to transmit messages onto the medium is dependent on the maximum packet size used and the priority of the node requiring access. In such system a node must wait for a free token which has a priority equal to or less then the priority of the node desiring to transmit before it can transmit information in the form of a data packet. Such priority systems are disclosed and proposed in IBM token ring information and in the IEEE 802.5 report on token ring standards. However, if a real-time local area network is to permit a wide range of packet sizes to be used for example large data packet for file transfers, and short packet control purposes, and short packets for control information then some nodes may face unacceptable time delays. Thus time critical messages may not have access to the network when desired and other nodes may be limited to short packet lengths. Further conventional token passing networks tend to allocate network capacity a frame at a time. This means that several short messages in one node could be transmitted before a long message in another node which had started earlier could be transmitted.

An object of the present invention is to obviate and mitigate the aforesaid disadvantages of the aforementioned local area network priority system.

SUMMARY OF THE INVENTION

This is achieved by using a logically separate interrupt priority control channel on which an interrupt is generated and which suspends transmission of a packet from a lower priority node and allows a higher priority interrupting node, which desires to transmit a higher priority message, to obtain rapid access to the transmission medium and to transmit the message. The message is interrupted using a within packet interrupt which is taken to include any command which results in the transmission of a packet onto a common-medium being halted before the complete packet has been transmitted. In addition, the priority of nodes can be adjusted either by a centralised network manager or by intelligent terminals distributed amongst the nodes, allowing priorities to be adjusted at nodes to correspond to the relative priorities of messages currently at these nodes rather than having a fixed allocation of priorities. In a token ring implementation, suspension of the message causes a busy token to be released which recirculates round the ring. A token is then freed to the interrupting node or nodes which claims the token and uses the token to transmit the higher priority message and, after transmission cycle of the message, the token is returned to its free state and its original node to complete transmission of the original message, in the absence of another active higher priority node.

The within packet interrupt can be implemented in software or hardware and is particularly suitable for use with token passing local area networks and especially a token passing ring. The priority of the token is raised to the priority of the node desiring to transmit and after the transmission cycle the token is returned to its original node and the priority of the token is eventually returned to the priority of the original node in order to complete transmission of the original message.

The interrupt node priority control system has an advantage in that non-homogenous computer systems can communicate over a baseband as well as a broadband token ring type network, each non-homogenous computer system being coupled to the token ring via a ring access unit which contains the necessary hardware and software to implement a dynamically adjustable multiple priority mode using within packet interrupts to allow rapid access for time critical messages.

Accordingly, in one aspect of the invention there is provided a local area network interrupt node priority control system for use with a local area network having a plurality of nodes coupled to a shared transmission medium, each node being capable of receiving messages from external sources having different levels of priority, said local area network interrupt node priority control system comprising data carrying means for allocating access of each node to the shared transmission medium and shared transmission medium incorporating a logically separate priority interrupt control channel coupled to each node of said plurality of nodes, and in use, said data carrying means carrying a first message from a first node having a first level priority interrupt means for detecting when a second node has a higher priority message for transmission on said shared transmission medium, and for generating within packet interrupt signal to suspend transmisssion of said first message from said first node to release said data carrying means to said second node for transmitting said higher priority message, and means for eventually returning said data carrying means to said first node on completion of transmission of said higher priority message to complete transmission of said first message.

Preferably, said network includes dynamic reconfiguration means for allocating different priority levels to different sources so that relative priorities can be assigned to individual messages in relation to other messages using or just about to use the medium.

Preferably, said interrupt node priority control system is used with a local area network token passing system and particularly a token ring system and said data carrying means is a token having a token control byte in which bits are reserved for token priority.

Conveniently said system is coupled to a collision detection system for controlling access of the collision detection nodes to said network. Conveniently this is achieved by providing a token passing bus in parallel with said collision detection data bus and coupling the collision detection nodes in parallel with the real-time token control nodes to each bus. Alternatively, the system is coupled to the collision detection system bus using a real-time interface unit so that a single cable with multiple signal standards is used.

Conveniently the interrupt node priority control channel is carried on the shared transmission medium using time multiplexing techniques. Alternatively the interrupt node priority control channel is a separate hardwired channel.

Preferably, the priority of the token byte is immediately raised to that of the priority of the higher priority transmitting node, and after transmission of the higher priority messages the priority of the token byte is eventually reduced to the original priority of the node on which the transmission was suspended (through use of a temporary high priority).

Preferably, the priority control system is used with the serial data transmission system in which access to a shared medium with distributed control is provided by each node in the system. Alternatively the system is used with a parallel data transfer system.

Accordingly, in another aspect of the invention there is provided a method of permitting a higher priority message to be transmitted onto a shared transmitting medium of a local area network, said local area network having a plurality of nodes coupled to said shared transmission medium and on which a lower priority message is currently being transmitted by data carrying means, said method comprising the steps of monitoring the priority of messages being transmitted on said shared transmission medium and comparing the priority of the message transmitted with the priority of a message desired to be transmitted, generating within packet interrupt signal from a node having a higher priority message than the message currently being transmitted on a logically separate priority interrupt control channel, suspending transmission of said lower priority message from said first node, modifying said data carrying means to the same priority as said higher priority node, releasing said data priority means to said higher priority node, deactivating the interrupt signal and transmitting said higher priority message, providing the data carrying means to the original node and reducing the priority of the said data carrying means to the priority of the original message, and completing transmission of said original message.

Preferably, said interrupt request is generated on the same physical channel as the message. Alternatively, said interrupt request is generated on a separate physical channel. The interrupt request may be generated by a multiplexing technique or using multiple signal standards.

Preferably, where the difference in priority between the higher priority message and the message currently being transmitted is greater than one, multiple interrupt requests are generated to raise the priority of the current message to the priority level of the higher priority message.

In yet another aspect of the invention there is provided a local area network having a plurality of computer systems desiring access to a shared transmission medium for providing access of higher priority messages to said shared transmission medium during transmission of lower priority messages, said local area network comprising a shared transmission medium, a plurality of nodes coupled to said shared transmission medium, each node consisting of a computer system coupled to the shared transmission medium via a transmission medium access unit, said channel transmission medium incorporating a logically separate priority control channel coupled to each node of said plurality of nodes said transmission medium access unit having monitoring means for monitoring priority of messages on said shared transmission and comparison means for comparing the priority of said transmitted messages with a priority of a message from its associated computer system desiring to be transmitted, interrupt generating means for generating a within packet interrupt suspending the transmission of a message on said transmission medium having a lower priority, and said transmission medium access unit having priority control means for altering the priority of a data carrying signal to match the priority of said message to be transmitted, and for altering the priority of said data carrying means after transmission of said message to the original priority for completing transmission of said lower priority message.

Preferably said local area network is a token passing ring system and said data carrying means is a circulating token having a byte with bits reserved for message priority. Alternatively said system is a parallel processing system including having means for dynamically reconfiguring the priority of respective nodes in the parallel processing network.

Preferably said interrupt is generated via a software control algorithm stored in said transmission medium access unit and said logically separate priority interrupt control channel is provided by multiplexing information on said shared transmission medium. Alternatively a physically separate priority interrupt control channel is provided and an interrupt is generated on said physically separate priority interrupt control channel.

BRIEF DESCRIPTION OF THE DRAWINGS

These and other aspects of the present invention will become apparent from the following description when taken in combination with the accompanying drawings in which:

FIG. 1 is a diagrammatic view of a token passing ring local area network;

FIG. 2a is a schematic view of a token packet for use in a multiple interrupt only priority system in accordance with the present invention;

FIG. 2b is a schematic view of a data packet for use with the multiple priority system in accordance with the embodiment of the present invention;

FIG. 3 is a diagrammatic view of a token passing ring in accordance with an embodiment of the present invention;

FIG. 4 is a diagrammatic view of adjacent nodes on a token ring according to the present invention having different priorities;

FIGS. 5a,b and c illustrate diagrammatically a means of time-multiplexing the node priority control channel onto the data channel;

FIG. 8 is a schematic view of a parallel processing control system in accordance with a further embodiment of the invention in which a multiple priority interrupt node control system can be implemented;

FIG. 9 illustrates an alternative token to that shown in FIG. 2a for use with an interrupt and standard priority system;

FIG. 11 illustrates a diagrammatic view of an Ethernet collision detection network including real-time nodes in accordance with a second embodiment of the present invention;

FIG. 12 depicts schematically an Interface Access Unit for use with an Ethernet collision detection network;

FIG. 14 is a network similar to that shown in FIG. 11 except that a single physical medium is used for data and control signals;

FIG. 15 is a diagram similar to FIG. 12 for use with the network shown in FIG. 14;

FIG. 16 is a schematic diagram of a real-time access for use with the network shown in FIG. 14;

FIGS. 17-20 depicts the token and data packet format for use with IEEE 802.5 and IEEE 802.4 compatible priority LAN systems, and FIG. 21 is a diagrammatic arrangement of mixed real-time and non real-time nodes.

Figure 6:
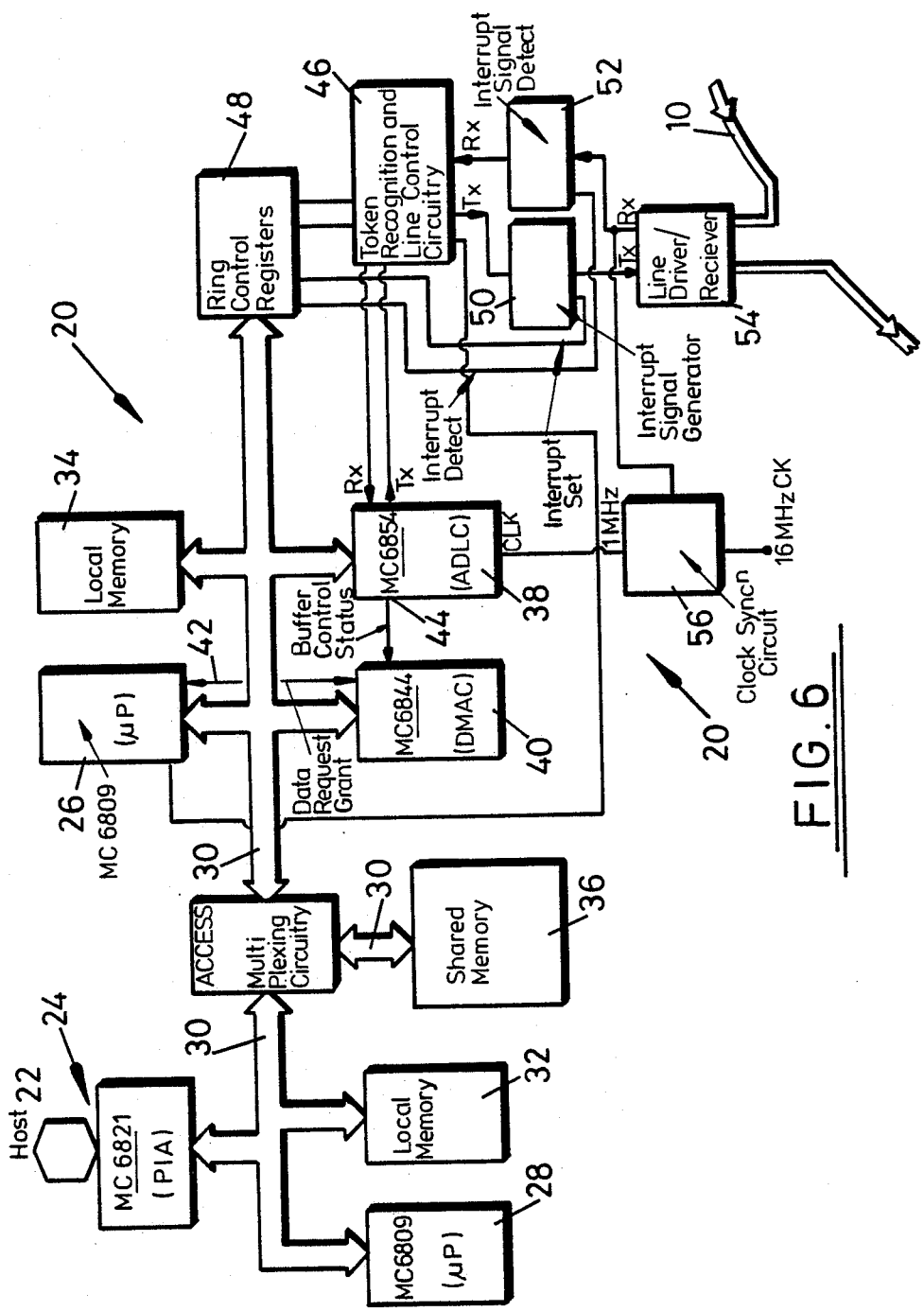
FIG. 6 is a schematic block diagram of an access unit for use in an embodiment of one aspect of the present invention.

Reference is first made to FIG. 1 of the drawings which illustrates, in general, a token passing network which has a single token ring 10 to which is coupled a plurality of nodes 12 and a monitor 14. In a conventional token passing ring a token circulates through the ring past each node and, in order for a node to transmit data onto the ring, it must wait until a free token is received. On arrival at the node desiring to transmit a packet of data the token is changed to a busy state, the data is released onto the ring and the packet is checked on its return to the original source and removed from the ring. The receiving node monitors the ring for a packet with a destination address equal to its own address.

As will be explained, acknowledgement bits in the token are set according to whether the frame is accepted, rejected or ignored. With a ring such as described above priority of each node is equal and the first node to receive a free token which desires to transmit a message obtains the token 16, however, if a node has a high priority message then it has to wait until the token has circulated around the ring and is free in order to transmit its message. If there are large data packets for file transfers and short packets for control type information then it is possible that some nodes could face unacceptable time delays.

Accordingly, in the following description is described embodiments of a multiple priority access system for use with a token ring network as described above. This is achieved, in part, by modifying the token 16 which as illustrated in FIGS. 2a and 2b comprises a series of bytes FIG. 2a illustrates a token packet which consists of five bytes, the first byte called a start delimiter byte which indicates the start of the frame followed by a token control byte which contains a series of bits identifying; whether the token packet is free or busy, the token type for indicating a normal or reserved token, a reserved bit (set=0 for hardware purposes) and four interrupt priority bits giving 16 (0 to 15) priority levels. This byte is following by 2 bytes for cyclic redundancy check sum and by a further byte called an end delimiter byte which indicates the end of frame.

A data packet consists of a series of concatenated bytes starting with a start delimiter and token control byte which are described above followed by a data control byte which is available for "virtual circuit/datagram link level" control purposes and followed by a destination address which identifies a specific station for which the frame is intended. The destination address is followed by a source address which identifies the station that sent the frame. This is followed by "n" bytes of data which are of variable size and typically range from 0 to 4 k kilobytes. Following the data byte are two cyclic redundancy check (CRC) bytes for ensuring that the integrity of the data transmitted is correct and this again is followed by an end delimiter byte which is as described with regard to the token packet.

Reference is now made to FIG. 3 of the drawings which illustrates a local area network system in accordance with an embodiment of the invention. The local area network system consists of the token ring having a plurality of nodes 12 as described above. It will be seen that each node 12 consists of an access unit 20 and a host device, e.g. 22 which is coupled to the token ring via the access unit 20. The local area network system permits host computers having a higher priority than the priority of the circulating token to obtain access to the ring and suspend transmission of the message on the ring as will be explained. This is achieved by utilising an extra control channel, designated "priority interrupt control channel" (PICC) so that any node can request a less important tranmission to be suspended using a within packet interrupt. The node currently sending a data packet around the ring can accept or reject this request according to a number of data bytes still to be transmitted, as will be described. If the request for suspension of transmission is accepted by the lower priority node a free token is released by the node with its priority incremented as necessary to the priority of the requesting node of the correct priority. The token released is claimed by the first downstream node desiring to transmit. This is achieved through use of a busy token whose priority is incremented on each recirculation until the PICC goes off. The first downstream node with matching priority then transmits its message and after transmission the token is eventually returned to the original node which changes the token priority bits back to the original level. The interrupted node assumes a temporarily a high priority to recapture the token.

This is best illustrated with reference to FIG. 4 which shows two adjacent nodes on a token having different priorities, one priority being greater than the other priority. Assuming that the free token with a priority equals 1 is passed to node 1 and is claimed by the node which then starts to transmit data in its data packet. Node 2 monitors the transmission and compares the priority of the token with its own message which is an urgent message arriving at the node after the node 1 has begun to transmit and realises that the priority of the token is less than its own message and sets the interrupt channel to its 'ON' state. The interrupt channel travels on the same single baseband token ring by a multiplexing technique although it will be appreciated that it could be hardwired using a separate channel. As will be described, the node 1 detects the on state of the interrupt channel and then decides to interrupt the data transfer of the packet. This depends on the amount of untransmitted data. For example, an algorithim is present in the node which recognises the percentage of data still to be transmitted and if the amount of data is less than for example 10% of the total data or a fixed number of bytes e.g. 100 bytes the interrupt request would be ignored and the message completed. However, it will be assumed for purposes of explanation that here more than 10% data is remaining and that the interrupt request is accepted. When this occurs the station increments the priority of the token by successive recirculation of the busy token to equal the priority of node n at which point the node n turns the PICC off and then releases a free token which is claimed by node n. When the node n has claimed the free token and the interrupt channel is off, the higher priority message is then transmitted. This transmission is effected in the normal manner and the token eventually recirculates around the ring back to node 1 (which has temporarily raised priority). When the token is received at node 1 the token priority is reduced to the priority of node 1, and the original transmission is continued.

If the difference in priorities between node 1 and node n is greater than one then node n requires to make more than one interrupt request to raise the token priority to its message priority. However, it will be appreciated that this can be achieved by increasing the number of interrupt channel states and providing control to raise the level of the token to that of the priority message without the necessity for multiple interrupts.

Reference is now made to FIGS. 5a,b and c of the drawings which illustrates respectively a receiver/transmitter clock wave, a typical data channel with the interrupt channel off and a data channel with the interrupt channel on. As shown in FIG. 5b for a 1 megabyte per second signal the clock period is 1 microsecond. When the interrupt occurs it occurs in every cycle of the clock and causes the data channel to be interrupted for a predetermined period, for example, 250 nanoseconds on each bit of data for suspending transmission of the data. The transmitting data, $T_x$, is set on the rising edge of the clock and the receiving sample data, $R_x$, on the falling edge of the clock. It will be seen that the interrupt channel is time multiplexed on the data channel between the falling edge of the clock and the rising edge of the clock, in the second part of a clock cycle.

This is readily achieved by using a faster synchronised clock and counting the number of clock periods and passing the information with the data channel through a D-type flip-flop to produce an interrupt output for a suitable period defined by the faster clock to effect the interrupt to the data channel.

Reference is now made to FIG. 6 of the drawings which illustrates an access unit 20 as used in the system shown in FIG. 3. The access unit 20 is shown in block diagram form and includes hardware detect and generate interrupts and this will be explained.

The access unit 20 is a self-contained multi-processor based device which controls the network protocol and the interface 24 to the host computer. It will be appreciated that each access unit 20 is functionally similar and can be added to or removed from the network resulting in minimal interference to other nodes. It will also be appreciated that any node can be dynamically assignable as a ring monitor to enable the system to start-up, close-down and undertake fatal error detection, for example, if a free token is corrupted, and also for controlling the recovery from these conditions. The access unit 20 is coupled to the host computer 22 via peripheral interface adapter (PIA) MC6821 and the access unit is based on two 1 mhz MC6809 microprocessors 26 and 28 which are coupled to each other through a bus system 30. The microprocessors 26 and 28 work in parallel. The microprocessor 28 operates a program stored in local memory 32 to control the host interface which has a high speed bi-directional data channel which can be configured to suit an individual host computer system interface. The local memory 32 retains local data and programs for operation by the processor 28.

Microprocessor 26 controls the actual token ring 10 and its main duties are to send or receive data packets from the ring, to ensure the integrity of information transfers by checking the cyclic redundancy status, by providing interrupt channel control and monitoring the status of the hardware which detects a free token with the correct priority. Local memory 34 contains data and programs for permitting these duties to be carried out by the microprocessor 26. Microprocessors 26 and 28 communicate with each other by writing and reading blocks of data from a dual port random access memory 36 and semaphores are used to prevent memory access contention. A chip MC6854 (ADLC), is used to perform serial/parallel and parallel/serial operations and to assemble and disassemble packet of data as well as perform the CRC polynominal block checks. The ADLC 38 is coupled to a direct memory access controller (DMAC) MC6844 40 which transfers data between the ADLC and the memory 36, and vice versa, at high speeds along the bus 20. A direct memory access request/grant control lines 42 is coupled between the DMAC 40 and the microprocessor 26 and the buffer control/status lines 44 are coupled between the DMAC 40 and the ADLC 38.

Free token recognition is performed by a token recognition and line control circuit 46 which is coupled to the ADLC 38 and to ring control registers 48, which are coupled to the bus 30. Token recognition and line control circuit 46 will be later described with reference to FIG. 7. As will be explained by configuring the token recognition line control circuit a free token can automatically be claimed and processor 26 interrupted.

The token ring 10 is coupled to interrupt generator and interrupt detector circuits 50 and 52 respectively via line driver receiver unit 54. The interrupt generator 50 in turn, is coupled to the token recognition circuitry and to the ring control registers as is the interrupt detector circuits 52 for setting and detecting interrupts respectively. Thus the processor 26 uses the ring control registers 48 to configure the operation of the interrupt generator and interrupt detect modules 50 and 52, and also the token control circuit 46. In particular, the interrupt generator module 50 is used to switch the time multiplex interrupt node priority channel on or off to modify i.e. interrupt the data information on the data channel as shown in FIG. 5c. It will be understood that the line driver receiver can be an RS-422 or a fibre optic device or any other suitable transceiver.

Incoming serial data from the token recognition or line control circuitry is transmitted to the ADLC circuit 38 along data line $R_x$ and information from the ADLC circuit 38 to the token recognition circuit 46 is passed along data line $T_x$. The clock synchronisation hardware 56 synchronises the clock of the ADLC 38 with incoming serial data on line $R_x$ from the line driver receiver 54 using an edge detection method.

It will be appreciated that it is important to recover the clock in the ADLC and this can be difficult if there is a great number of data bits having the same value. This problem is overcome by using "bit stuffing" and NRZI encoding in which a bit of a designated value is inserted into the data stream at regular intervals for clock recovery and data transparency and this technique is well known in the art. The DMAC 40 controls data transfer between the memory and the ADLC and similarly if it was desired to transmit blocks of data from the shared memory to the host interface this could also be done but would require a second DMAC to be coupled to the bus 30 and associated with processor 28.

In use, the comparison of the token is carried out in circuit 46 with the priority of the information desired to be transmitted from a particular access unit at a node onto the ring, when the priority of the message to be transmitted is higher than the priority of the token the processor 26 controls circuit 46 and interrupt generator 50 to generate an interrupt onto the bus and this is detected by the access unit associated with the transmitting node which suspends transmission of the data. Thus the interrupt detect circuit 52 detects the state of the incoming interrupt channel and if this is high then it interrupts the data channel as shown in FIG. 5c and releases a free token to the higher priority access unit which transmits its higher priority message as afore described.

Figure 7:
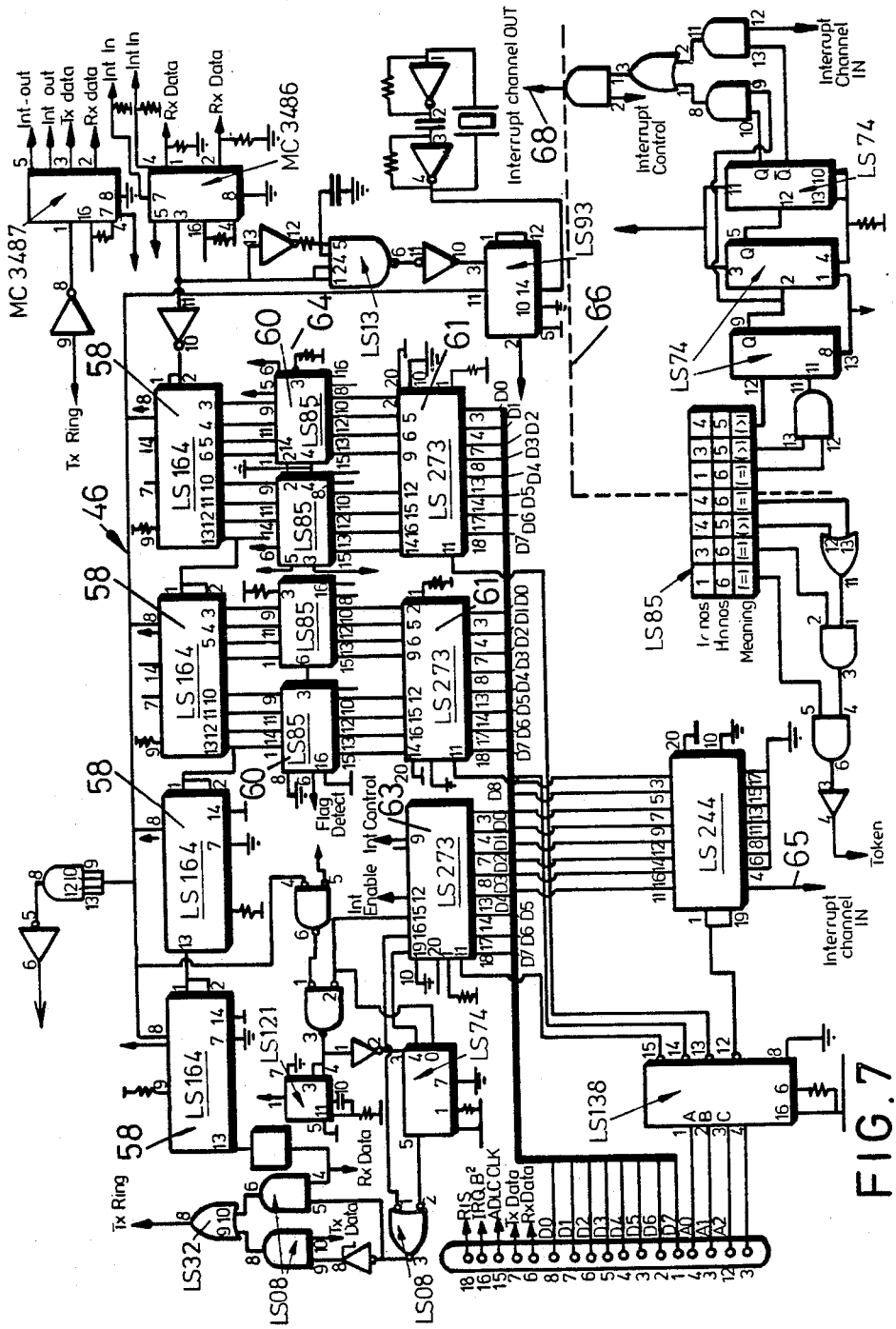
FIG. 7 is a circuit diagram of token recognition and line control circuitry of the access unit shown in FIG. 6.

Reference is now made to FIG. 7 of the drawings which illustrates a detailed circuit diagram of the token recognition and line control circuit 46 shown in FIG. 6. Incoming data on line $R_x$ of the interrupt detect is serially transmitted to a plurality of shift registers 58 and the token data including priority information is stored in these shift registers. A series of comparators, LS85's, designated by reference numeral 60, compares the information in the shift register with the information stored in regisers 61 LS273 which are configured by the microprocessor 26. The configured information is used to determine whether a free token is to be claimed.

This information includes Start of Frame Delimiter and the waiting message token control field respectively. The ring control register 63 is set for a token claim, and the microprocessor waits for a successful claim or timeout. The hardware uses the 4-bit comparators output (1-4) to check whether to claim a token. for example, if (Comp 1 "=" AND Comp 2 "=") AND (Comp 3 "=")
    START FLAG DETECT STATUS/TOKEN TYPE MATCH
AND (Comp 4 "=" or Comp 4 ">")
    NODE PRIORITY>PASSING MESSAGE PRIORITY
Then claim token.

The comparator output 64 is coupled to an output logic circuit generally indicated by reference numeral 66 the output of which interrupt channel out 68, is coupled to the interrupt generator 50. The comparator outputs determine the generation of the output signal. The incoming interrupt signal on line 65 is OR'ed with the logically generated interrupt signal to produce the output signal to the next node.

Logically the operation to interrupt a node is, if ("Interrupt Enable") AND (Comp 1 "=" AND Comp 2 "=") SOFTWARE GENERATED START FLAG DETECT AND (Comp 3 ">") Then Local Interrupt Signal=Comp 4 ">" BUSY TOKEN DETECT MATCH MESSAGE PRIORITIES The output is high if the priority of the node's message is greater than that of the passing token otherwise it is low. Thus the interrupt priority of a passing busy token is campred with the node's own interrupt priority. The Interrupt channel state is automatically updated as every busy token passes.

However, if a node sets the channel 'ON' the signal will eventually circulate back to its own OR gate. When the node changes its signal to 'OFF' the channel could remain in the 'ON' state indefinately. Accordingly to overcome this problem output logic circuit 66 was added and it acts to clear the channel for a short time, (greater than the channel's propogation delay) afer a node changes its local interrupt state, if no other nodes are generating an 'ON' signal. Thus depending on the output of the comparator the circuitry 68 will generate an interrupt signal to the interrupt generator 50 which will in turn set an interrupt which will be recognised by ring control registers 48 and processor 26. It will be appreciated that the information in storage register 62 can be reconfigured by the processor to suit a variety of different conditions.

Without departing from the scope of the invention it will be appreciated that various modifications may be made to the apparatus hereinbefore described. For example, the processor 28 could be omitted and the processor 26 coupled straight to the host computers system bus to simpify the access unit. In addition, if it is required to transmit data rapidly from shared memory 36 to the host computer and vice versa then a further direct memory access unit could be coupled to the bus 30 and associated with processor 28. In addition, although the interrupt is shown to be time division multiplexed it will be appreciated that a separate hardwired channel could be used for the interrupt to achieve the same effect. However, this would result in an extra conductor and for a situation requiring a single conductor would not be desirable, however, it would be preferable if very high data rates are used because the multiplexing system may prove difficult. The ADLC 38 may be replaced by a parallel-serial/serial parallel converter with a CRC generator.

A further embodiment of the invention is disclosed in FIG. 8 of the drawings which illustrates a parallel processing system generally indicated by reference numeral 70 of which a plurality of local processors and local memories generally indicated by reference numeral 72 are coupled to a global processor 74 via a common bus or transmission medium 76. Global processor controls transfer of parallel data between the processors 72 and between the processor 72 and the global processor. The global processor 74 also acts as a network manager for redistributing priority between the processors and it will be understood that a priority control system as hereinbefore described may be applied to such a parallel processing system notwithstanding that the global processor can redistribute priority of the individual parallel processing units 72. This can be implemented in a software control system as hereinbefore described with reference to the token ring system or alternatively can be in the form of a hardwired arrangement using a separate interrupt line 78 as shown. However, it will be appreciated that each processor and global processor will require an access unit to detect and generate interrupts as and when required to permit data having a higher priority to be transferred onto the bus and to suspend data for lower priority.

Reference is now made to FIG. 9 of the drawings which illustrates an alternative token. In this case the token has 5 bytes as before however, the arrangement of bits in the token control is different. The token control has a first bit which indicates when it is a token or data, a second bit for indicating free of busy status and a third monitor bit. This is followed by 3 standard token priority bits followed by two interrupt priority bits.

In order to claim a token the first three bits must match exactly and the token priority bits must be greater than or equal to the passing tokens (standard) priority. A node may only switch the interrupt channel 'ON' if the message awaiting transmission has a higher interrupt priority than the passing busy token.

Figure 10:
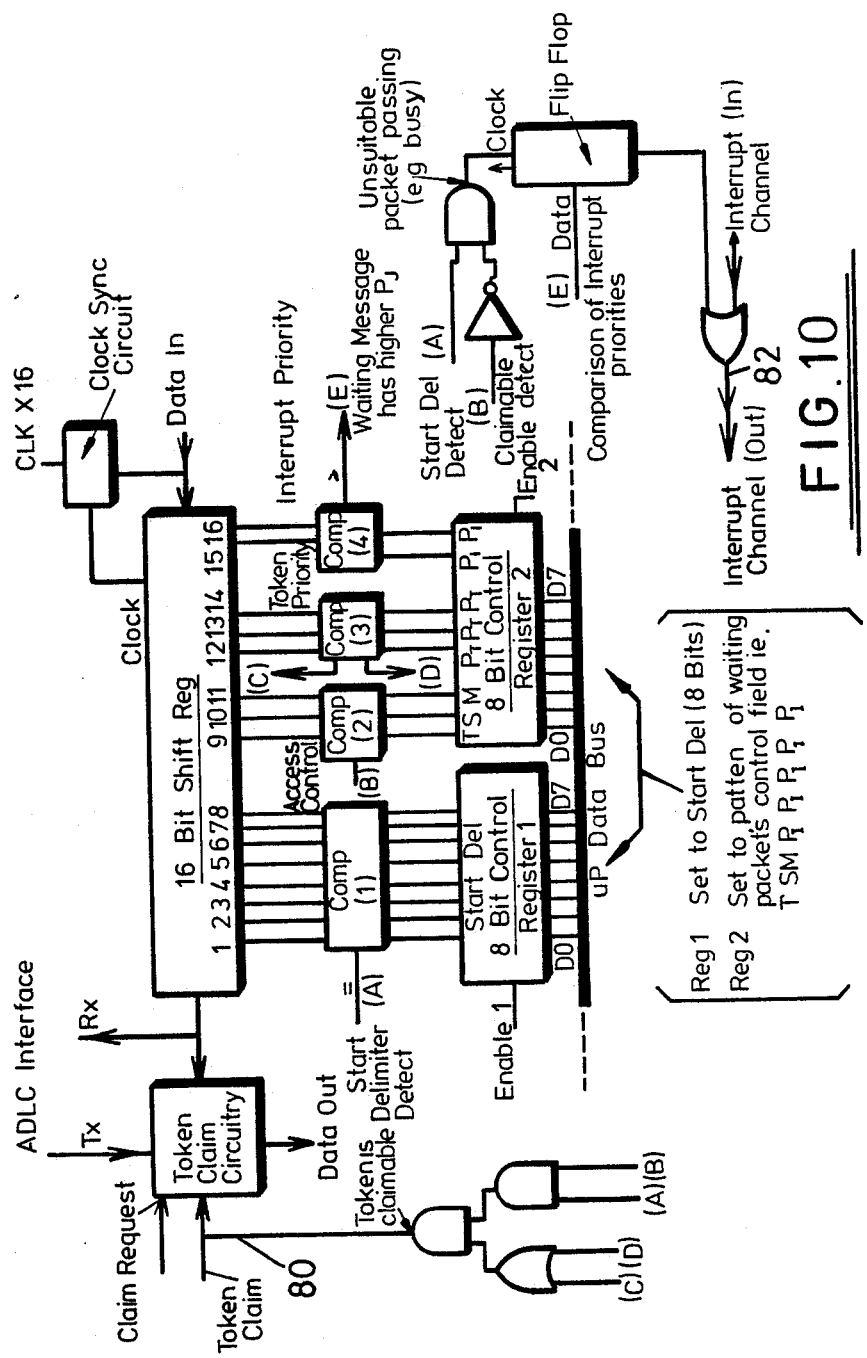
FIG. 10 illustrates a block diagram similar to FIG. 7 but for use with the token format of FIG. 9.

Reference is now made to FIG. 10 which illustrates modified hardware to that shown in FIG. 7, and only in the wiring of the comparators. This enables the system to analyse both the passing tokens "standard priority" and its "interrupt priority". A token claim signal 80 is thus generated by the comparators by comparing the two standard priority fields when a free token passes whereas the interrupt signal 82 is generated by comparing the interrupt priority fields when a busy token passes. As with the aforedescribed embodiment the microprocessor of the access unit configures the ring control registers via the data bus.

A further embodiment of the invention is illustrated with reference to FIG. 11 through 13 of the drawings, in which an interrupt priority control system according to the present invention is interconnected with an "Ethernet" (trademark) collision detection type network.

Reference is first made to FIG. 11 of the drawings in which a plurality of Standard Ethernet Nodes 90 are coupled to Standard Ethernet Transceivers 92 spaced along a Standard Ethernet Cable 94 via Interface Access Units (I.A.U's) 96. In parallel with the Standard Ethernet Nodes are Real Time Nodes 98 also coupled to the cable 94 by transceivers 100 via Real-Time Access Units (R.T.A.U) 102. The I.A.U's and R.T.A.U's are connected to a Priority Interrupt Control Channel (PICC) 103, which is shown as a bus although it can be connected as a ring.

Each Interface Access Unit 96 is located in the drop cable between the Ethernet node 90 and transceiver 92. As can be best seen in FIG. 12 there are four twisted pairs; Transmit, $T_x$; Receive $R_x$; Collision Detect and Power, and the $T_x$ and CD lines are coupled via switches 104,106 which are conveniently implemented using logic gates respectively to a Command Signal Detector and Logic Unit 108 which, in turn, is coupled to the PICC 103.

The IAU 96 operates in two modes, firstly it provides normal connections to the net. When an interrupt occurs it opens the $T_x$ connection between the node and transceiver and may set the collision detect line active. This prevents other nodes starting to transmit before the net returns to the non real-time node. Therefore, by opening the $T_x$ switch 104, the current packet is lost. Alternativley the IAU 96 can include means for storing each packet and retransmitting it once the net returns to the non real-time node, such as a microprocessor controlled IAU.

When an interrupt from a real-time node 98 is allowed a start control packet is sent over the PICC 103 to instruct all IAU's to open their $T_x$ switches. Alternatively the PICC is designed to take several signalling standards, such as voltage levels, frequencies, or phase not normally used to send data over the PICC 103. For example, if the normal data transfer levels are 0 and +5V then a +12V level, for (2 μs say), will open all $T_x$ switches 104 and set collision detect. A −12 volt signal for 2 μs say, will close all $T_x$ switches and clear collision detect at the end of transmission of the real-time message. However, there may be separate control of the $T_x$ switch 104 and the collision detect signal generation.

Thus the IAU is controlled using multiple signalling standards on the PICC and hardware logic to control the $T_x$ and collision detect operations.

Figure 13:
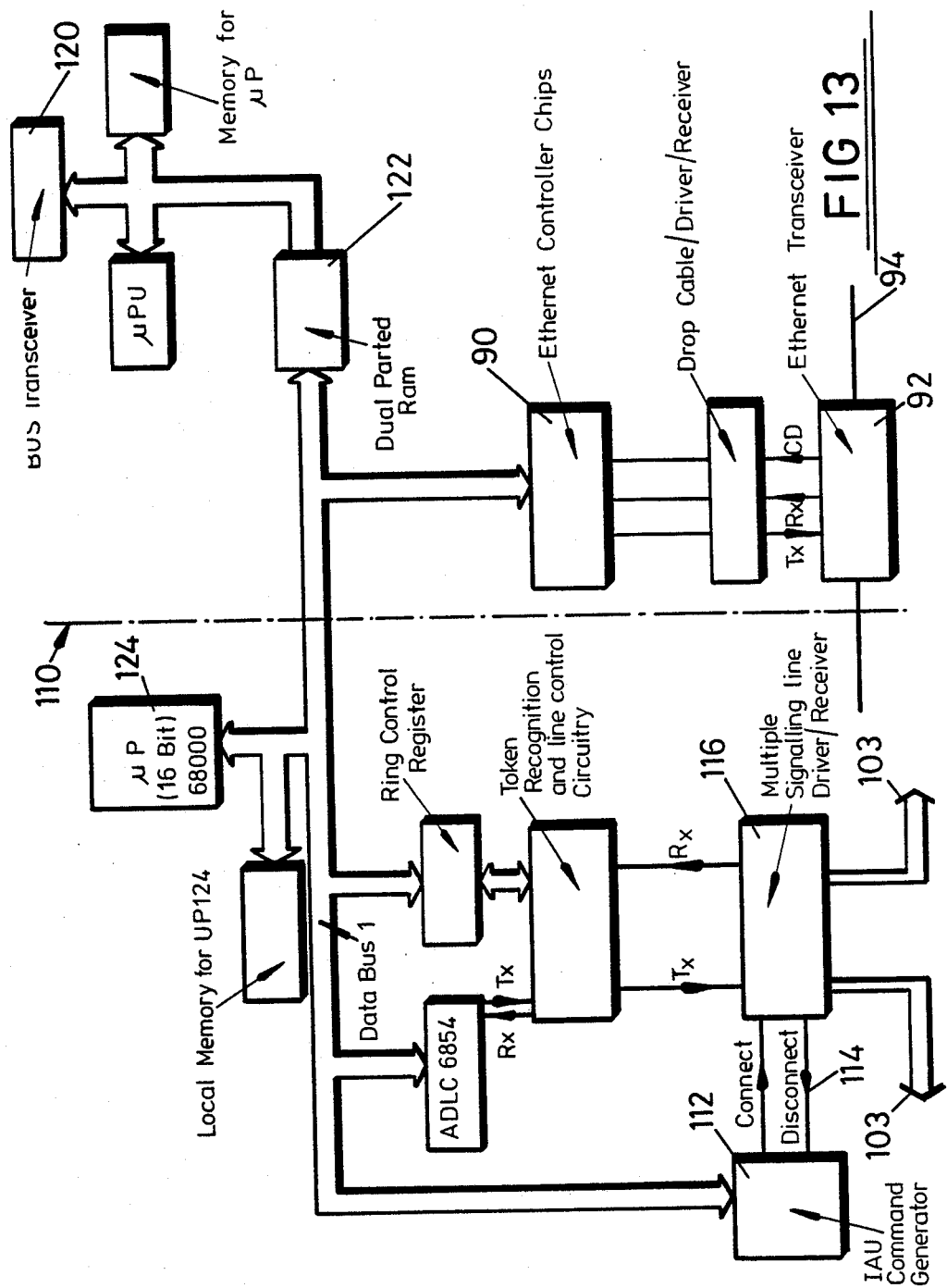
FIG. 13 depicts schematically a Real-Time Access Unit for use with an "Ethernet" collision detection network.

Reference is now made to FIG. 13 of the drawings which illustrates in more detail a RTAU 102 as shown in FIG. 11. The RTAU 102 has a token passing ring control section 110 which controls token passing, token capture and generation of interrupts as afore described with reference to FIG. 6. Thus section 110 generally undertakes the task necessary to establish whether it has the right to take control of the ring from other contending real-time nodes using Instanet type procedures.

Once control is achieved the IAU generator command module 112 sends a signal on a Disconnect Line 114 to the multiple signal standard line driver/receiver 116. This sends a pulse over the PICC 103 to the IAU's 96 on the Ethernet node thus disconnecting all standard Ethernet transmitters from the Ethernet bus.

Node N than sends its data over the Ethernet bus, releases the token and drops the priority and the first RTAU 102 which sees a suitable priority free token sends a command to turn on the IAU's.

Microprocessor 118 handles the interface with the host via bus transceiver 120 and transfers data packets to and from the Dual Part RAM 122. Once data is loaded in RAM 122, a flag location in the dual part RAM is set and the processor 124 continuously polls the flag location above. Alternatively processor 118 can send an interrupt to processor 124. The processor 124 controls the token passing protocol of the PICC 103 in a manner similar to that performed by processor 26 in FIG. 6.

The RTAU's include suitable circuitry to permit 10 m bits/sec operation. This may be achieved by using a Motorla X25 controller (XPC) MC68605 instead of the ADLC 38 used in the token passing network. Conveniently, the PICC 103 supports a token passing access protocol similar to that using in the implementations of FIGS. 2-7 and 8,9 although central polling of the RTAU's 102 is possible to determine 'the next turn'.

It will be appreciated that these means can be applied to other existing established networks as well as Token Bus and Token Ring and they could be retrofitted to an installed network.

Reference is now made to FIGS. 14,15 and 16 which illustrate a futher embodiment of the invention in a Token bus/collision detection network implementation similar to that shown in FIGS. 11-13. In FIG. 14 it will be seen that the PICC channel and Ethernet bus are included in a single physical medium or Ethernet cable 130 which has multiple signal standards, for example, voltage levels or time division multiplexing. This uses Ethernet transecivers interface unit (ETIU) 132 capable of generating and receiving these multiple signal standards. In this arrangement an IAU is included within the transceiver. Also the real-time nodes use a Real-Time access unit 134 coupled to a Real-Time Interface Unit (RTIU) 136 on the cable 130.

The ETIU is best seen in FIG. 15, it provides standard Ethernet drop cable connection $T_x, R_x, CD$ and power supply to IEEE 802.3 specification. The ETIU also incorporates the control logic 138 and $T_x$ and CD switches 140,142 as previously included in the separate IAU. It will be appreciated that in this implementation allocation of access between the real-time nodes uses a token passing system as before with the interrupt generation techniques hereto forementioned. However, in this case a token bus implementation is used.

The Real-Time Access Unit 134 in FIG. 16 is similar to that described in FIG. 13 except for the connections to cable 130. The Access Unit includes the RTIU 136 which is capable of generating and receiving the multiple signal standards of the bus. Conveniently, it splits the bus signals into those associated with passing of data and these associated with the passing of token and other control information. It will be appreciated that the signalling levels used for data are those used by the ETIU's so that data can be passed between real-time nodes and standard Ethernet nodes. The signal levels used for control are fed to the token recognition and control circuitry 144 of the real-time access unit.

An IEEE 802.5 compatible LAN priority system will now be described with reference to FIGS. 17-20 in which the IEEE 802.5 specifications for data packet and token format are given. It will be understood that the data and token packets shown in FIGS. 17-20 may be used with the same basic system shown in FIGS. 1-7.

One embodiment of the invention uses these data packet and token formats and operates in a closely upward compatible manner from the IEEE 802.5 specification. A logically separate PICC channel is provided as before and the interrupted node accepts or rejects the interrupt as before.

On acceptance of the interrupt by node K (the interrupted node) the K node releases a busy token with the reservation bits set at the lowest level of interrupt priority being used. As the busy token circulates round the ring back to node K any node with a higher priority requesting access to the medium sets the reservation bits accordingly.

Node K then releases a free token with priority bits set at the highest level of priority encountered on the circulation of the busy token. Node K at this time raises its priority level to a temporary anassigned value just below the first interrupt priority lead).

The first interrupting node ($I_r$) at that level of priority downstream of node K then captures the free token, transmits its packet preceded by a busy token at say priority level O. Any nodes wishing to transmit (including node K) raise the reservation field to match the value of its priority. Node $I_r$ then releases a free token at that level of priority for capture, by node $I_q$ say, as before. The process repeats until interrupts are cleared, whereupon the last interrupt node lowers the free token priority to the temporary value. This token circulates back to node K which eventually transmits the remainder of its message.

It will be appreciated that the invention can be applied to the token bus such as that specified in the IEEE 802.4 specification.

The IEEE 802.4 specification includes facilities for incorporating several classes of traffic from a single node (Class 6, synchronous, Class 4, Class 2 and Class 0). There is however no mechanism for assigning priorities to nodes. An Instanet arrangement which is IEEE 802.4 upwards compatible therefore incorporates these priority features.

There are a number of possible embodiments within the scope of the invention as appear applicable to the token bus specified in the IEEE 802.4 specification. Firstly, an embodiment can be applied where only a single level of interrupt is required.

On occurrence of the interrupt, the interrupted node (K) then accepts (or rejects) the interrupt in the usual way. If accepted all nodes stop their token hold and token rotation timers at their current value and node K issues a free token addressed to the next node in the logical ring in the normal manner. However non-interrupting nodes (of the class K) sense the on state of the PICC and pass the token on to the next node. The first interrupting node to receive a free token captures it, transmits its short interrupt message and releases a free token. Other interrupting nodes then transmit their messages until the PICC goes OFF. It will be appreciated that during interrupt operation the source address of the token remains node K. Thus the last interrupting node can pass the token directly back to node K when the PICC goes OFF. K transmits the remainder of its packet.

Secondly there is an embodiment which is applied where several levels of interrupt are required. As before all token hold timers and token rotation timers are frozen at their current values.

In one method of implementing a prioritised interrupt structure capable of dealing with several simultaneous interrupts the PICC is organised as a ring and provided with token passing capabilities.

In this case node K (on being interrupted) issues a busy token over the PICC ring. The priority of the busy token is raised to match that of the highest priority interrupt node as it recirculates round the ring. The address field of the PICC token (FIG. 20) is changed where the priority of the token is changed.

On recirculation of the PICC token K issues a token addressed to first highest priority node to interrupt on the logical ring. Once this node has transmitted its message it issues a free token back to node K. If the PICC is still ON the above process repeats otherwise K transmits the remainder of the interrupted packet.

Alternatively and according to the invention the PICC assumes responsibility for token passing (using busy and free tokens) among the interrupting nodes until the PICC goes OFF, i.e. normal token passing is suspended. (The priority of other interrupting nodes can be determined by issuing busy tokens at low priority and allowing them to recirculate).

In a third embodiment an interrupt enable message is transmitted over the PICC (which is organised as a ring) by node K as it starts its transmission. This message (a special token packet STP) contains the priority level of the source address information. As an interrupt request in the form an STP circulates round the ring any node with a higher priority interrupt changes the source address to its own address, raises the priority level again to its own and passes the request on until it recirculates to the original interrupting node flagged to prevent update by intervening nodes of the interrupted node, K.

The interrupted node, K truncates its packet transmission in an orderly manner and issues a token addressed to the highest interrupt node which transmits its packet and then issues an interrupt request at the lowest interrupt priority level over the PICC (actually one level less than lowest used interrupt priority level). If the source address and interrupt level are unaltered (i.e. because no other nodes are interrupting a token addressed to the node K is issued. Otherwise the token is addressed to the next interrupting node.

FIG. 21 depicts a diagrammatic arrangement of mixed real-time and non real-time nodes which can be applied to a bus or ring as hereinbefore described.

The host 150, for example a real-time vision system may be coupled to the bus 152 via an Instanet real-time node 154. A non real-time (NRT) node 156 for example a personal work station is connected to bus or ring 152 via an Instanet interface node 158. The interface node 158 is coupled to real-time node 154 and to other nodes by the PICC, which may be organised as a bus or as a ring, and node 158 which may conveniently be microprocessor controlled also contains a packet buffer 160 for storing the data packets for subsequent action by the system.

It will be appreciated that different types of interrupt may be used with the systems hereinbefore described for example, transmission may be immediately suspended without regard for priority or number of the remaining bytes in the form of a non-maskable interrupt or this may be achieved using a hardwired interrupt system. Alternatively as hereinbefore described a software controlled or maskable interrupt can be provided which uses a discretionary algorithim to decide whether data transmission is to be suspended depending on the number of remaining bytes in the message. It will also be appreciated that the interrupt channel could be extended to include control information, for example, if the token priority is increased by more than one and could also carry information from a central global processor so that priority of individual nodes coupled to the ring of the bus can be adjusted.

In addition, nested interrupts may be used so that a higher priority message which itself has interrupted a lower priority message can be interrupted by an even higher priority message and this can be achieved using a software control system using for instance, a program counter to indicate in a register stack where the interrupts are to permit or prevent interrupts as and when required. It will also be appreciated that the hardware hereinbefore described is based on TTL logic elements although this may conveniently be implemented in another logic form, for example, CMOS, gallium arsenide, optical or emitter copuled logic (ECL). In addition, it will be appreciated that the multiple priority access system hereinbefore described could be applied to other network formats, for example, star bus or tree configurations and suitable for a priority system for controlling access of a node to a shared medium where control is distributed or to a distributed control system for dynamically redistributing priority between nodes. The system could be used with a token passing bus such as the MAP (manufacturing automatic protocol) or with broadcast systems. Also the ADLC unit could be incorporated with the DMA functions. In the case of each packet, the last byte in the data packet can contain acknowledgement bit information which can be set by the receiver to acknowledge a successful transmission, and this information is returned to the sender unti to check the integrity of the message and retransmit the message if required or pass the token around the ring. The reserved bits in the tokens can be modified using comparators shown in FIG. 7 and changing the shift register configuration by the microprocessor. Also the 32 bit delay introduced by the shift registers could be reduced to a minimum delay of 1 bit by the addition of suitable circuitry using comparators operating at bit level.

Thus the local area network priority control system allows urgent messages access to a shared medium by suspending traffic on the medium and it provides means of allocating different priority levels to different sources so that relative priorities can be assigned to individual messages in relation to other messages using or just about to use the medium. It will also be understood that each node in the system can compare the priorities of messages by acting on segments in the message which carry the priority information and which may be located at any predetermined position in the message. Also the system is applicable to token passing and collision detection systems as well as various different types of network configurations, including metropolitan systems.

We claim:

1. A local area network interrupt node priority control system for use with a local area network having a plurality of nodes coupled to a shared transmission medium, each node being capable of receiving messages from external sources having different levels of priority, said local area network interrupt node priority control system comprising data carrying means for allocating access of each node to the shared transmission medium, said shared transmission medium incorporating a logically separate priority interrupt control channel coupled to each node of said plurality of nodes and in use, said data carrying means carrying a first message from a first node having a first level priority interrupt means for detecting when a second node has a higher priority message for transmission on said shared transmission medium, and for generating within packet interrupt signal to suspend transmission of said first message from said first node to release said data carrying means to said second node for transmitting said higher priority message, and means for eventually returning said data carrying means to said first node on completion of transmission of said higher priority message to complete transmission of said first message.

2. A local area network priority control system as claimed in claim 1 wherein said network includes dynamic reconfiguration means for allocating different priority levels to different sources so that relative priorities can be assigned to individual message in relation to other messages using or just about to use the medium.

3. A local area network priority control system as claimed in claim 1 wherein said interrupt node priority control system is used with a local area network token passing system and particularly a token ring system and said data carrying means is a token having a token control byte in which bits are reserved for token priority.

4. A local area network priority control system as claimed in claim 1 wherein said system is coupled to a collision detection system for controlling access of collision detection nodes to said network.

5. A local area network priority control system as claimed in claim 4 wherein access is controlled by disposing a token passing bus in parallel with a collision detection data bus and coupling the collision detection nodes in parallel with real-time token control nodes to each bus.

6. A local area network priority control system as claimed in claim 1 wherein access is controlled by coupling said system to a collision detection system bus using a real-time interface unit so that a single cable with multiple signal standards is used.

7. A local area network priority control system as claimed in claim 1 wherein the interrupt node priority control channel is carried on the shared transmission medium using time multiplexing techniques.

8. A local area network priority control system as claimed in claim 1 wherein the interrupt node priority control channel is a separat hardwired channel.

9. A local area network priority control system as claimed in claim 1 wherein the priority of the busy token byte is immediately raised to that of the priority of the higher priority transmitting mode, and after transmission of the higher priority messages the priority of the token byte is eventually reduced to the original priority of the node on which the transmission was suspended.

10. A local area network priority control system as claimed in claim 1 wherein the priority control system is used with a serial data transmission system in which access to a shared medium with distributed control is provided by each node in the system.

11. A local area network priority control system as claimed in claim 1 wherein the system is used with a parallel data transfer system.

12. A method of permitting a higher priority message to be transmitted onto a shared transmission medium of a local area network, said local area network having a plurality of nodes coupled to said shared transmission medium and on which a lower priority message is currently being transmitted by data carrying means, said method comprising the steps of:
monitoring the priority of message being transmitted on said shared transmission medium and comparing the priority of the message transmitted with the priority of a message desired to be transmitted,
generating a within packet interrupt signal from a node having a higher priority message than the message currently being transmitted on a logically separate priority interrupt control channel, suspending transmission of said lower priority message from said first node.
modifying said data carrying means to the same priority as said higher priority node, releasing said data priority means to said higher priority node, deactivating the interrupt signal and transmitting said higher priority message,
providing the data carrying means to the original node and reducing the priority of the said data carrying means to the priority of the original message, and completing transmission of said original message.

13. A method as claimed in claim 12 wherein said interrupt request is generated on the same physical channel as the message.

14. A method as claimed in claim 12 wherein said interrupt signal is generated on a separate physical channel.

15. A method as claimed in claim 12 wherein where the difference in priority between the higher priority message and the message currently being transmitted is greater than one, multiple interrupt requests are generated to raise the priority of the current message to the priority level of the higher priority message.

16. A local area network having a plurality of computer systems desiring access to a shared transmission medium for providing access of higher priority message to said shared transmission medium during transmission of lower priority messages, said local area network comprising a shared transmission medium, a plurality of nodes coupled to said shared transmission medium, each node consisting of a computer system coupled to the shared transmission medium via a transmission medium access unit, said shared transmission medium incorporating a logically separate priority control channel coupled to each node of said plurality of nodes said transmission medium access unit having monitoring means for monitoring priority of messages on said shared transmission and comparison means for comparing the priority of said transmitted messages with a priority of a message from its associated computer system desiring to be transmitted, interrupt generating means for generating a within packet interrupt for suspending the transmission of a message on said transmission medium having a lower priority, and said transmission medium access unit having priority control means for altering the priority of a data carrying signal to match the priority of said message to be transmitted, and for altering the priority of said data carrying means after transmission of said message of the original priority for completing transmission of said lower priority message.

17. A local area network as claimed in claim 16 wherein said local area network is a token passing ring system and said data carrying means is a circulating token having a byte with b its reserved for message priority.

18. A local area network as claimed in claim 16 wherein said system is a parallel processing system including having means for dynamically reconfiguring the priority of respective nodes in the parallel processing network.

19. A local area network as claimed in claim 16 wherein said interrupt is generated via a software control algorithm stored in said transmission medium access unit and said logically separate priority interrupt control channel is provided by multiplexing information on said shared transmission medium.

20. A local area network as claimed in claim 16 wherein a physically separate priority interrupt control channel is provided and an interrupt is generated on said physically separate priority interrupt control channel.

21. A local area network interrupt node priority control system as claimed in claim 16 wherein said shared transmission medium is a token passing bus and said data carrying means is a circulating token for circulating around said nodes.

22. A local area network interrupt priority control system as claimed in claim 21 wherein means are provided for providing a single level of interrupt on occurrence of said interrupt non-interrupting nodes suspending token capture and the interrupted node reissues a free token addressed to the next node in the logical ring.

23. A local area network interrupt node priority control system as claimed in claim 21 wherein means are provided for providing a plurality of levels of interrupt, the node with the highest priority to interrupt receiving the token and the token being returned to the interrupted node unless an interrupt is still present.

24. A method as claimed in claim 12 wherein said local area network is a token bus and said data carrying means is a circulating token having a byte with bits reserved for message priority.

25. A method as claimed in claim 24 wherein a single level of interrupt is provided.

26. A method as claimed in claim 24 wherein multiple levels of interrupt are provided.

27. A local area network as claimed in claim 16 wherein said local area network is a token bus and said data carrying means is a circulating token which circulates round a logical group of nodes.

* * * * *